United States Patent [19]

Chapman

[11] 4,087,218
[45] May 2, 1978

[54] ROTARY ENGINE

[76] Inventor: Paul F. Chapman, 1057 Martindale Ave., Hudson Falls, N.Y. 12839

[21] Appl. No.: 747,179

[22] Filed: Dec. 3, 1976

[51] Int. Cl.² .......................... F01C 21/00; F01C 1/00
[52] U.S. Cl. .................................................. 418/259
[58] Field of Search ............... 418/259, 260, 261, 264, 418/265

[56] References Cited

U.S. PATENT DOCUMENTS

| | | | |
|---|---|---|---|
| 44,247 | 9/1864 | Wood et al. | 418/261 |
| 1,922,363 | 8/1933 | Hapkins | 418/265 |
| 2,636,480 | 4/1953 | Becker | 418/260 |
| 3,455,109 | 7/1969 | Daniels | 418/260 |

Primary Examiner—John J. Vrablik
Attorney, Agent, or Firm—Schuyler, Birch, Swindler, McKie & Beckett

[57] ABSTRACT

A continuous torque rotary engine comprising a drive shaft having a rotor secured thereto. The rotor carries a plurality of radial sliding blades and is surrounded by an outer stationary cylinder between which a plurality of pressure chambers are formed by means of chamber separators. Rotatable hump plates transfer the blades into and out of the pressure chambers to clear the chamber separators during rotor rotation. Identical end covers having an annular chamber close the stationary cylinder and connect pressure and exhaust ports in each of the pressure chambers to a pressurized fluid supply and an exhaust outlet, respectively.

13 Claims, 7 Drawing Figures

ROTARY ENGINE

BACKGROUND OF THE INVENTION

1. Field of the Invention

The present invention relates generally to rotary engines and, more particularly, to a sliding blade rotary engine.

2. Description of the Prior Art

Rotary engines have been known which convert steam or which convert the pressurized gases resulting from the ignition of a combustible fuel into a mechanical output torque. For example, U.S. Pat. Nos. 192,547 to Vaile and 44,247 to Wood et al. disclose a rotary engine comprising a cylindrical rotor secured to a drive shaft and concentrically mounted inside a stationary cylinder. A plurality of chamber separators extend inwardly from the stationary cylinder to bear against the periphery of the rotor to form a plurality of pressure chambers. Sliding blades carried in spaced radial slots in the rotor extend into the pressure chambers where they are acted upon by the pressurized motive fluid to turn the rotor and the drive shaft.

The rotary engines shown in the Wood and Vaile patents, which may be termed sliding blade type engines, are quite complicated and are made from numerous components, thereby increasing the cost of the engines. For example, both Wood and Vaile provide separate valves for each of the pressure chambers to separately control the pressure inlet and exhaust outlet in each chamber. In addition, the inlet and exhaust ports of these valves are connected to supply passages located in an outer jacket surrounding the stationary cylinder. The outer jacket increases both the size and weight of the engine. Finally, both Wood and Vaile project the sliding rotor blades into a steam tight fit with the stationary cylinder thereby imposing a great deal of friction and wear on the blades. In this regard, U.S. Pat. No. 1,488,729 to Ballay discloses a method for limiting the outward movement of sliding rotor blades in a rotary pump to prevent friction with the stationary cylinder, but this is accomplished only through the use of movement controlling slots in flanges attached to the sides of the rotor, the flanges again increasing the size and complexity of the pump.

Another problem presented by sliding blade rotary engines is the need to transfer the blades during movement of the rotor below the stationary abutments used to form the pressure chambers. Most prior art devices for accomplishing this are either unduly complicated and expensive or present problems of extreme wear on the blades. For example, the Wood and Vaile patents use fixed cams on the engine housing to coact with pins extending from the blades to reciprocate the blades into and out of their slots in the rotor. Such an unyielding relationship between the components quickly wears the pins on the blades, thus necessitating frequent blade replacement and giving rise to increased operational costs.

The Ballay patent and U.S. Pat. No. 1,530,307 to Dawson disclose a slotted rotatable ring and a plurality of rotatable star wheels, respectively, for reciprocating the blades in a rotary pump or engine. These devices probably cause somewhat less wear on the blades than engagement with a fixed cam. However, Ballay's ring must be mounted eccentrically with regard to the rotor to accomplish reciprocation of the blades, thereby increasing the size of his engine. Dawson's star wheels are only effective to extend, not to retract, the blades, and are driven in a timed relationship by the drive shaft to extend the blades, thereby diverting part of the power produced by the engine just to operate the blades.

SUMMARY OF THE INVENTION

Accordingly, it is an object of the present invention to provide an improved sliding blade rotary engine which is extremely simple to manufacture, inexpensive to produce and easy to service.

It is a further object of the present invention to provide an improved sliding blade rotary engine in which the wear on the engine components is reduced to a minimum thereby prolonging the useful life of the engine and obviating the need for frequent replacement of worn parts.

These and other objects of the present invention have been accomplished by providing a rotary engine having a drive shaft with a rotor fixedly secured thereto. The rotor carries a plurality of movable radial blades which are projected outwardly to extend into a plurality of pressure chambers formed between the periphery of the rotor and the inner surface of a stationary cylinder concentrically surrounding the rotor. The stationary cylinder is provided with pressure and exhaust ports which communicate with each of the pressure chambers. Identical end covers close both faces of the stationary cylinder and connect the pressure and exhaust ports in the cylinder to a pressurized fluid supply and an exhaust outlet, respectively.

The rotor blades have protrusions projecting outwardly from each side which engage a plurality of rotatable hump plates mounted in the end covers of the engine. Each of the hump plates has a plurality of spaced peripheral recesses with a chordal pitch equal to the chordal pitch between blade protrusions on adjacent blades. As the hump plates rotate, they transfer the blades down underneath the chamber separators by virtue of their engagement with the blade protrusions and then allow the blades to be projected upwardly back into close proximity to the inner surface of the stationary cylinder. In addition, stop rings are provided in the rotor for limiting the outward movement of the blades to prevent the blades from wearing on the inner surface of the stationary cylinder.

The source of pressurized fluid to operate the engine of the present invention is preferably provided in a continuous ignition combustion chamber connected to the end covers of the engine through a rotatable valve by which the direction of the engine can be suitably reversed. When the rotor blades have been extended into the pressure chambers with their outer ends closely adjacent the inner surface of the stationary cylinder, the pressurized fluid conducted from the combustion chamber through one of the end covers into the pressure ports formed in the stationary cylinder will act upon the blades to drive the blades and the rotor forward. The forward movement of the blades will scavenge any of the pressurized fluid left in the pressure chamber behind the previous blade. As the blades reach the exhaust port formed in each of the chambers of the stationary cylinder, the protrusions on the blades engage the hump plates to begin the transfer of the blade underneath the chamber separators. Two blades are provided for each pressure chamber and are so positioned and operated by the hump plates such that one blade is always in working position in each of the chambers at all times.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

DESCRIPTION OF A PREFERRED EMBODIMENT

Figure 1:
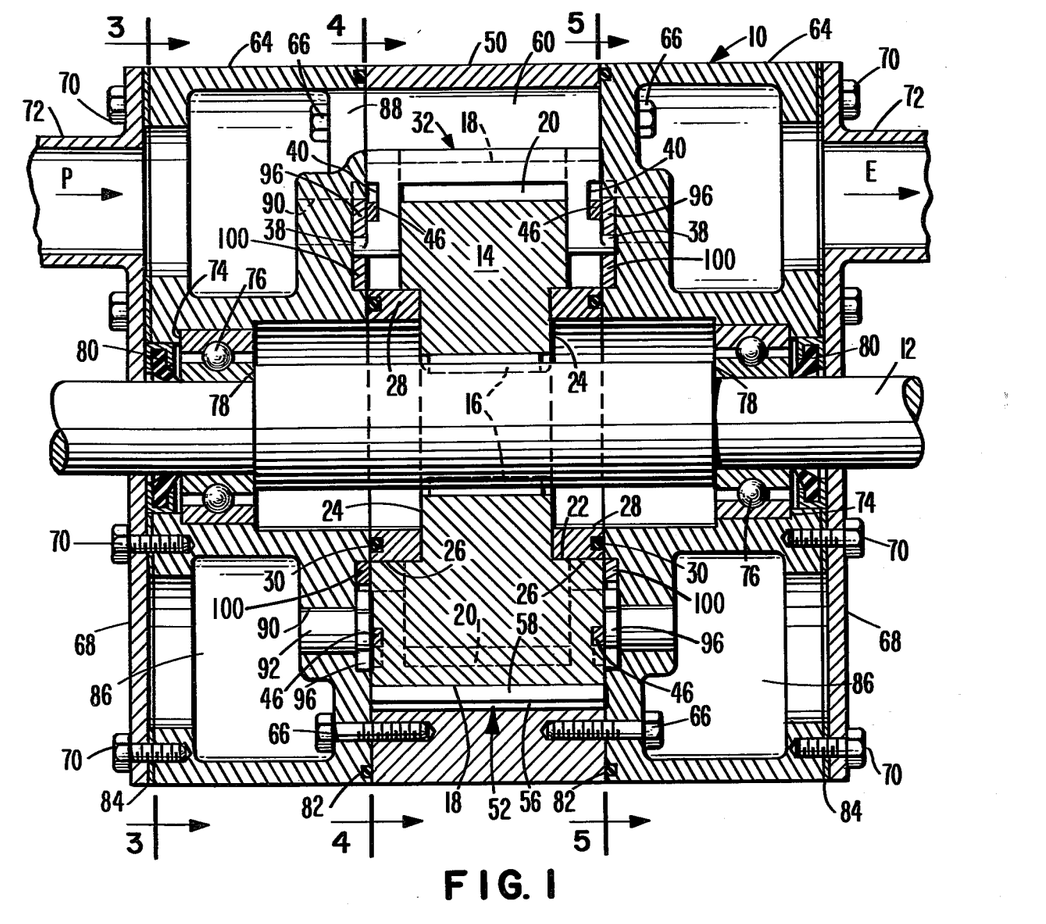
FIG. 1 is a cross-sectional view of the engine according to the present invention taken along the line 1—1 of FIG. 4.
Figure 2:
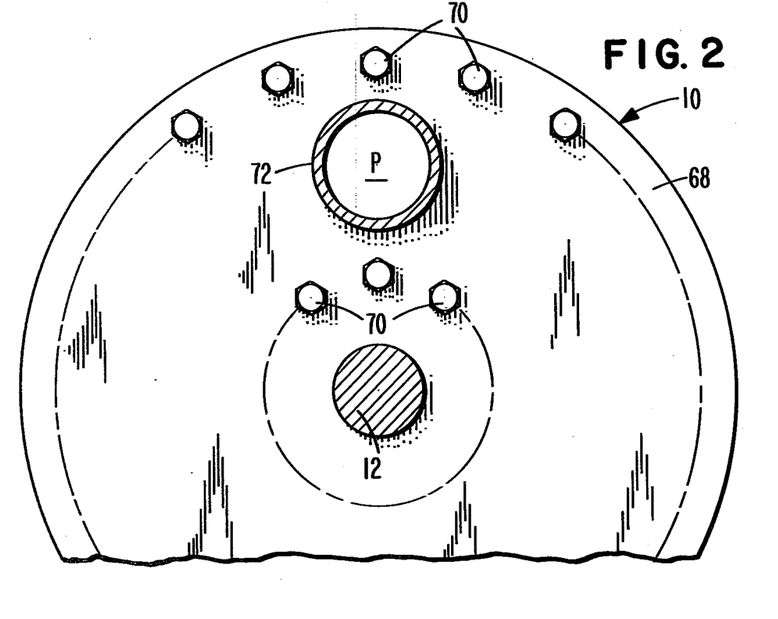
FIG. 2 is a partial side elevational view of the engine according to the present invention.
Figure 4:
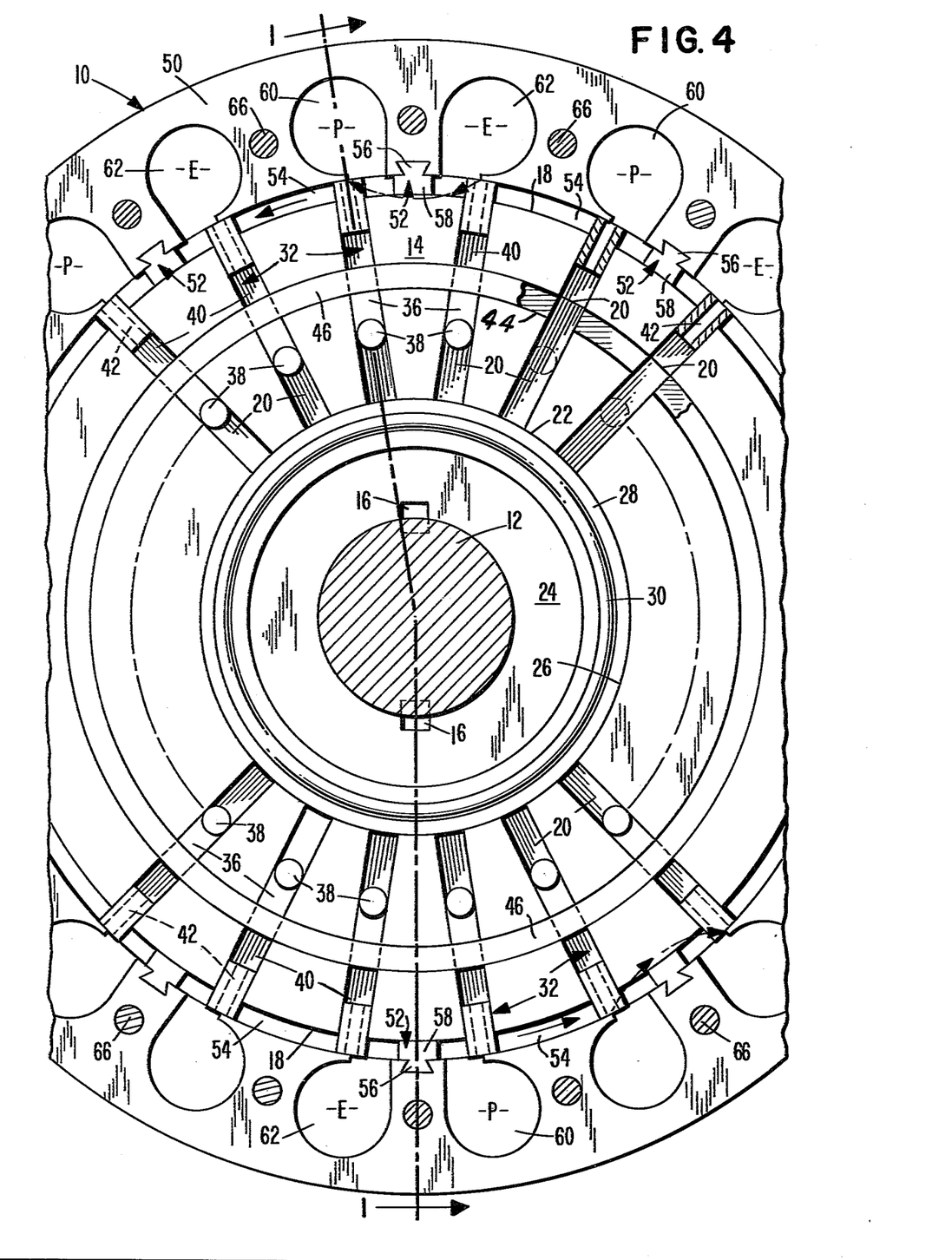
FIG. 4 is a partial cross-sectional view of the engine according to the present invention taken along line 4—4 of FIG. 1.

Referring first to FIGS. 1 and 4, a rotary engine 10 according to the present invention comprises a drive shaft 12 having a cylindrically shaped rotor 14 secured thereto by keys 16. Rotor 14 includes a periphery 18 containing a plurality of spaced radial slots 20 which extend inwardly from the periphery 18 to a diameter 22 intermediate between the periphery 18 and shaft 12. A circular recess 24 is provided in each side of the rotor 14 between shaft 12 and diameter 22 to form an annular shoulder 26 along diameter 22. A cylindrical seal ring 28 having an O-ring 30 in its outer face is received in each of the recesses 24 and abuts against the shoulders 26 to close the bottom of the slots 20. When the seal rings 28 are installed in recesses 24, their outer faces are flush with the sides of rotor 14 although the O-rings 30 project somewhat to perform a sealing function as will be described hereafter.

Figure 6:
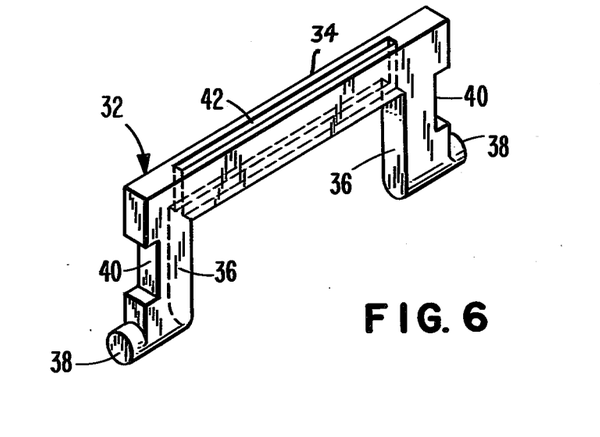
FIG. 6 is a perspective view of a rotor blade of the engine according to the present invention.

Each of the slots 20 provided in rotor 14 is U-shaped to receive a U-shaped blade 32 having a horizontal body portion 34 and inwardly extending vertical legs 36. Referring to FIG. 6, each of the vertical legs 36 of blade 32 has a protrusion 38 projecting outwardly therefrom and a recess 40 located above the protrusion 38. Each blade 32 also has a centrally disposed slot 42 projecting through the top and bottom surfaces of the body portion 34. Referring to FIGS. 1 and 4, both sides of the rotor 14 carries an annular groove 44 into which a circular stop ring 46 is placed flush with the sides of rotor 14. Stop rings 46 fit within the recesses 40 on the blades 32 carried in the slots 20 and project outwardly across each of the slots 20 in the rotor 14 to limit the outward movement of the blades 32 as will be described hereafter. Although rotor 14 has been shown as formed separately from drive shaft 12 and attached thereto by keys 16, rotor 14 could also be formed integrally with drive shaft 12 if so desired.

A stationary cylinder 50 concentrically surrounds the rotor 14 and is radially spaced a short distance from the periphery 18 of the rotor 14. A plurality of chamber separators 52 carried by the inner surface of cylinder 50 project inwardly to abut against the periphery 18 of the rotor 14 and thereby form a plurality of circumferentially spaced pressure chambers 54 for rotary engine 10. Each of the chamber separators 52 has a dovetailed portion 56 which slides into a corresponding dovetailed groove in the inner surface of cylinder 50 and a rectangular portion 58 which extends between the cylinder 50 and the rotor 14. Although the dovetailed chamber separators 52 shown in FIG. 4 are preferred since they can be easily replaced by merely sliding them out of the grooves in cylinder 50, the separators 52 could have any suitable shape and be machined integrally with the cylinder 50 or bolted or otherwise fixedly secured thereto.

It is preferred in the present invention to circumferentially space the chamber separators 52 at approximately 36° intervals around the periphery of engine 10 to provide 10 equally sized pressure chambers 54. Each of these chambers 54 communicates with a pressure port 60 and an exhaust port 62 provided in the stationary cylinder 50. Ports 60 and 62 are circumferentially spaced apart at 18° intervals and extend laterally through the cylinder 50 to open in both faces of the cylinder besides communicating with the pressure chambers 54 through the inner surface of cylinder 50. Similarly, the blades 32 carried by the slots 20 in rotor 14 are also spaced apart at 18° intervals to provide two blades per pressure chamber 54. However, other angular separations could be used in engine 10 to provide a greater or lesser number of pressure chambers and blades. For example, as the diameter of the engine 10 is increased, the angle of placement for the chamber separators 52 can be decreased to provide additional pressure chambers.

Figure 7:
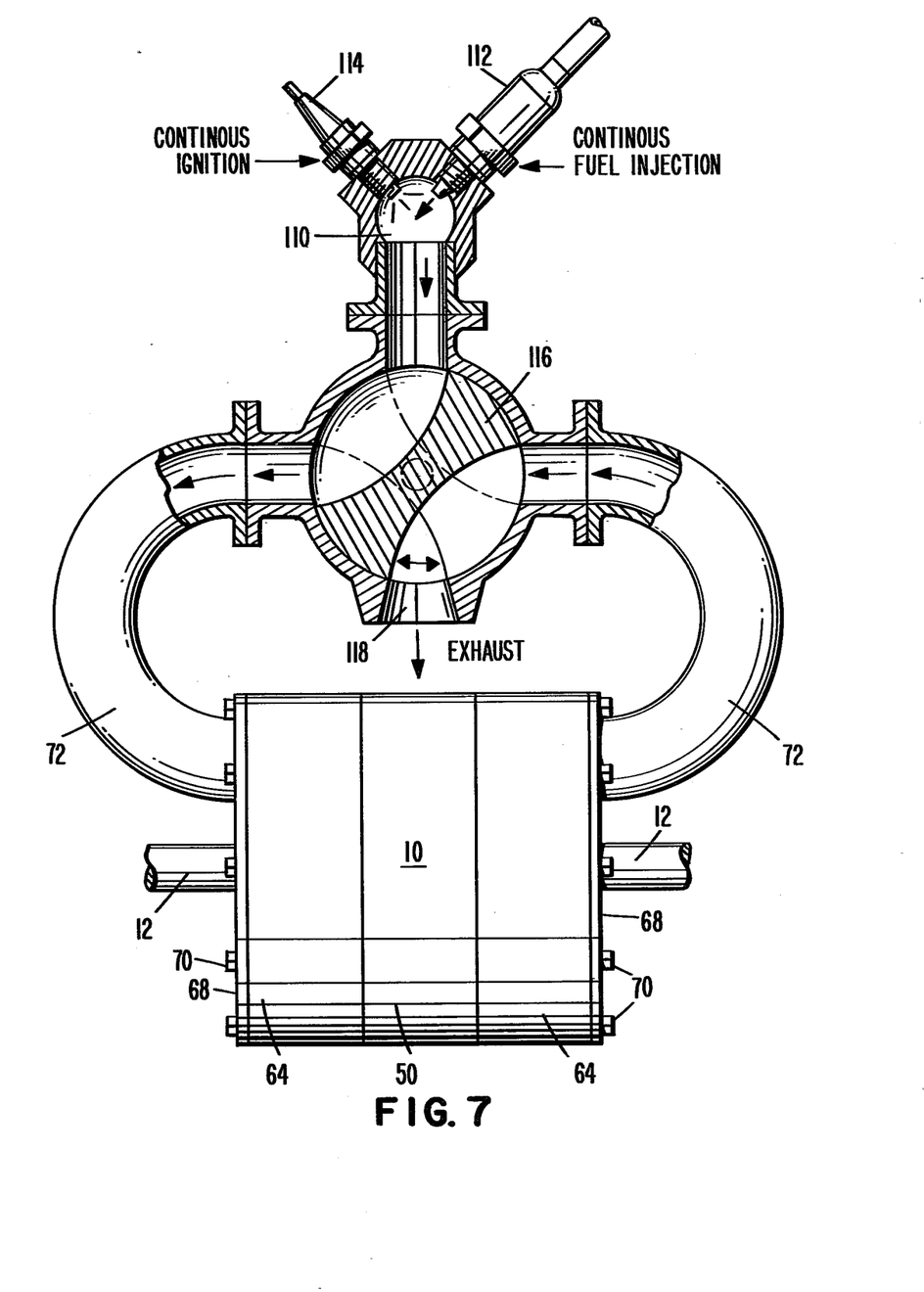
FIG. 7 is a front view of the engine according to the present invention.

Referring now to FIGS. 1 and 7, the stationary cylinder 50 is closed on both sides by an end cover 64 attached to the cylinder 50 by circumferentially spaced tap bolts 66. Similarly, end cover seal plates 68 are attached to the outer faces of both end covers 64 by tap bolts 70. Both the end covers 64 and the end cover seal plates 68 have inner diameters through which the drive shaft 12 passes to extend outwardly past the plates 68. Each end cover seal plate 68 has an outwardly projecting pipe 72 suitably connected to a continuous ignition combustion chamber 110 as will be explained hereafter.

As seen in FIG. 1, each end cover 64 has an annular shoulder 74 along its inner diameter which abuts against one end of an anti-friction bearing 76 placed around the drive shaft 12. The other end of bearing 76 contacts a shoulder 78 formed on the drive shaft 12 to prevent longitudinal movement of the shaft 12. A seal 80 is located between the drive shaft 12 and the inner diameter of end cover 64 in the space between the bearing 76 and the seal plate 68. Similarly, an O-ring seal 82 is placed between each end cover 64 and the stationary cylinder 50 and a gasket seal 84 is inserted between the end covers 64 and seal plates 68. O-rings 30 in the seal rings 28 prevent any fluid leakage between the rotor 14 and end covers 64 and are also needed whenever it is desired to utilize a lubricating or cooling fluid around drive shaft 12.

Each end cover 64 is cylindrically shaped having the same diameter as that of cylinder 50. Cover 64 also has an annular chamber 86 communicating at its outer end with the inlet pipe 72 in the end cover seal plate 68 and at its inner end with openings 88 formed in the right face of end cover 64. Openings 88 are circumferentially spaced around the end cover 64 at the same pitch and diameter as the pressure and exhaust ports 60 and 62 formed in the stationary cylinder 50. When one end cover 64 is attached to the left face of the cylinder 50 by the tap bolts 66, the openings 88 therein are aligned with the pressure ports 60 in the stationary cylinder 50 thereby connecting the pressure ports 60 to the pipe 72 in the left end cover seal plate 68 via the annular chamber 86. When the other end cover 64 is assembled to the right face of the cylinder 50, the openings 88 therein are aligned with the exhaust ports 62, rather than the pressure ports 60, thereby connecting the exhaust ports 62 to the pipe 72 in the other seal plate 68.

Figure 3:
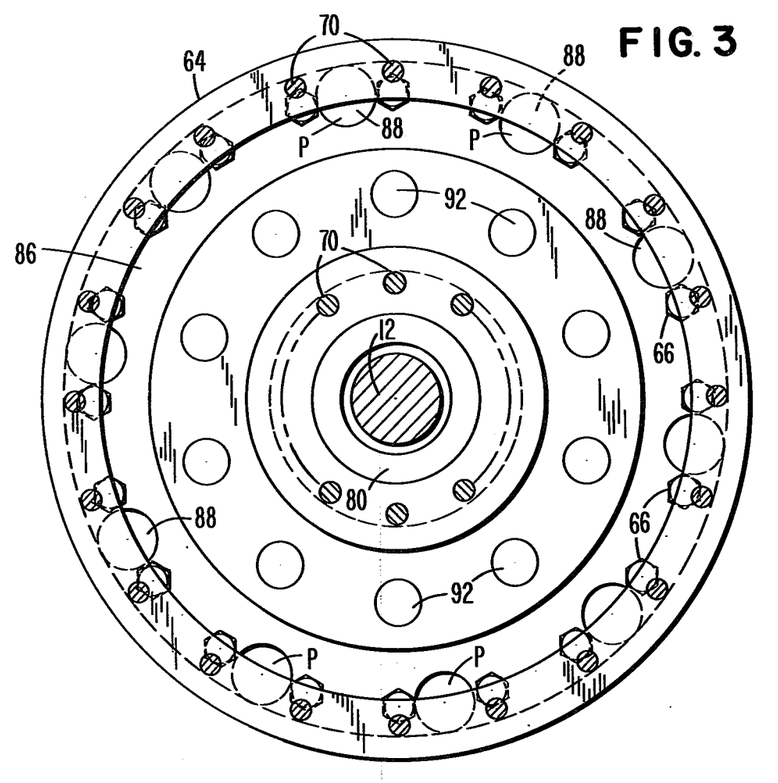
FIG. 3 is a cross-sectional view of the engine according to the present invention taken along line 3—3 of FIG. 1.
Figure 5:
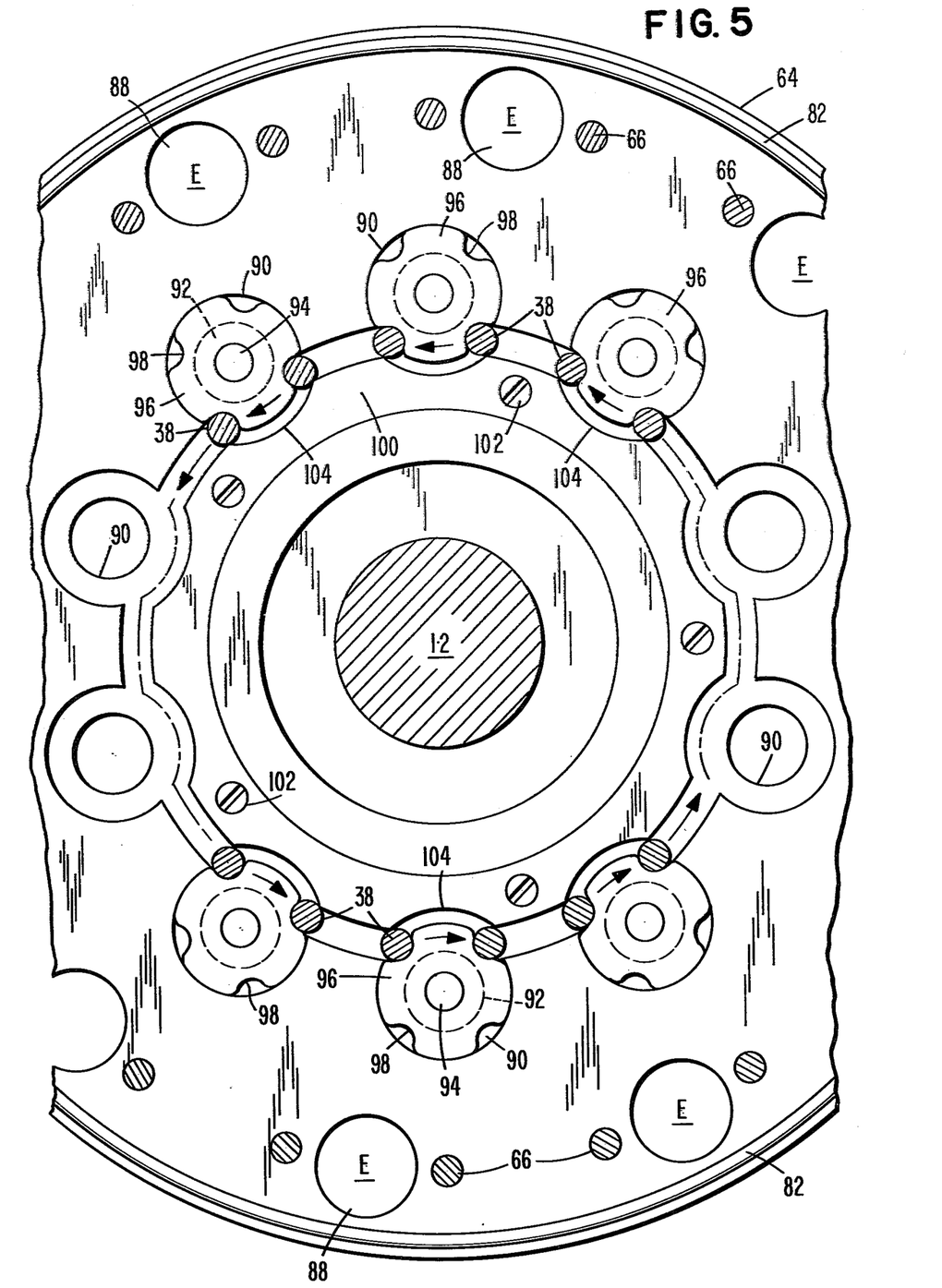
FIG. 5 is a partial cross-sectional view of the engine according to the present invention taken along line 5—5 of FIG. 1.

Referring to FIGS. 1, 3 and 5, each end cover 64 also includes a plurality of counterbored holes 90 in the face adjacent the rotor 14 at a diameter corresponding to the placement of the blades 32. Holes 90 are circumferentially spaced around the end cover 64 at a pitch equal to that of the chamber separators 52; when the end cover 64 is suitably secured to the stationary cylinder 50, each of the holes 90 is directly beneath one of the chamber separators 52. A shaft 92 is press fitted into each of the holes 90 and has an inwardly stepped end projecting into the counterbored portion of hole 90. A hump plate 96 will be rotatably mounted on the end 94 of shaft 92 flush with the inner face of end cover 64. Each hump plate 96 has four circumferentially spaced recesses 98 formed in its periphery to engage the blade protrusions 38 and transfer the blades 32 beneath the chamber separators 52 as will be described hereafter. An annular blade protrusion receiver 100 located immediately below hump plates 96 is secured by bolts or screws 102 to the inner face of end cover 64 and is flush therewith. Receiver 100 has a plurality of spaced arcuate recesses 104 underlying the hump plates 96 to engage and guide the blade protrusions 38 during blade transfer.

Referring now to FIG. 7, a combustion chamber 110 is provided having a continuous fuel injection system 112 and a continuous ignition device 114 such as a spark plug. Combustion chamber 110 can be used to convert water into steam or to ignite a combustible hydrocarbon fuel such as gasoline to produce a pressurized motive fluid for engine 10. It would also be possible to vaporize in chamber 110 a low boiling point liquid such as Freon 12 contained in a closed circuit thereby allowing for the recovery and reuse of the liquid after passing through engine 10. Although it is preferred in small diameter engines to use a single combustion chamber 110 outside of the cylinder 50 as shown in FIG. 7, large diameter engines could be provided with a separate continuous ignition spark plug in each pressure chamber 54. In the latter event, end covers 64 will transmit unignited fuel to the pressure chambers rather than the pressurized gases resulting from the combustion process.

A rotatable valve 116 connects the combustion chamber 110 and an exhaust outlet 118 to the pipes 72 in each of the end cover seal plates 68. When the valve member 116 is positioned as shown in solid lines in FIG. 7, the left side of the engine 10 is connected to the combustion chamber 110 and the right side of the engine 10 is connected to the exhaust 118. However, if the rotatable valve is moved 90° to its phantom position in FIG. 7, then the pressurized fluid resulting from the combustion process is conducted not to the left side but to the right side of engine 10 with the exhaust ports 62 becoming pressure ports and vice versa, thereby reversing the direction of rotation of engine 10.

In the operation of engine 10, the pressurized motive fluid produced in the combustion chamber 110 is conducted by the inlet pipe 72 through the left end cover 64 into the pressure ports 60 in the stationary cylinder 50. The pressurized fluid, which may be steam or the gases resulting from the combustion of a combustible fluid, will act on those blades 32 which have been extended into their working position shown in full lines in FIG. 4 to push the blades 32 thereby turning the rotor 14 and shaft 12. As blades 32 move forward, they serve to scavenge the fluid pushing the previous blade 32 into the exhaust port 62. The slots 42 allow the blades 32 to be suitably extended into their working position since the pressurized fluid continuously emanating from the pressure ports 60 can pass through the slots 42 and thereby not impede the upward movement of blade 32. In addition, the stop rings 46 are positioned to contact the bottom of the recess 40 in the blades 32 to limit the upward movement of the blades. Stop rings 46 ensure that each blade 32 in its working position will be closely adjacent the inner surface of the stationary cylinder 50 but not forced into tight contact therewith, thereby lessening the amount of wear on the outer surface of the blades 32 and prolonging their useful life.

Each blade 32 has a power stroke of approximately 18° from the beginning of pressure chamber 60 to the beginning of the following exhaust chamber 62. When each of the blades reaches the beginning of an exhaust chamber 62, the blade protrusions 38 contact one of the recesses 98 in a hump plate 96 and will begin to rotate the hump plate 96 about its shaft 92. As the hump plate rotates under the force of the blade protrusion 38, it will cam the blade protrusion 38 down in a circular arc to transfer the blades 32 underneath the chamber separators 52 as shown in dotted lines in FIG. 4, the transfer process also occuring in 18° of arc. The blade protrusion receiver 100 will guide the blades 32 during their transfer with the recesses 104 contacting the blade protrusions 38 to force them to follow a circular arc.

As each blade 32 begins its transfer underneath a chamber separator 52, the following blade 32 is just finishing its previous transfer and is being projected into its working position so that the incoming pressurized fluid will be effective to drive the blade onward. One blade is thus always in a working position in each of the pressure chambers 54 at all times. This feature is ensured by setting the pitch between adjacent recesses 98 on each hump plate 96 along a chord of the hump plate 96 equal to the pitch between adjacent blade protrusions 38 along the chord of the circle containing all the blade protrusions 38 as shown in FIG. 5. Thus, hump plate 96 will contact a blade 32 to begin transferring it underneath a chamber separator 52 at the same instant as it releases the previous blade for its power stroke. Although four recesses 98 have been shown in each hump plate, any number could be used depending on the size of the hump plate 96 and the spacing of blades 32. The rotation of the hump plates 96 also reduces the wear on the blade protrusions 38 by reducing the impact and thus the friction with the protrusions 38.

As mentioned previously, when the rotatable valve 116 is positioned as shown in full lines in FIG. 7, the pressurized fluid from the continuous combustion chamber 110 will be conducted to the left end cover 64 thereby imparting rotation to the rotor in one direction. However, when the rotatable valve 116 is rotated 90° to its dotted line position, the pressure ports 60 in the cylinder 50 become the exhaust ports and the motive fluid is then conducted to the right end cover 64, thereby imparting rotation to the engine 10 in a reverse direction. Thus, the rotary engine 10 may be run in either direction as desired or the valve 116 may be oscillated between its two positions to reciprocate engine 10 like a double acting piston. The engine 10 can also be operated as a rotary pump by conducting a liquid to be pumped into pressure chambers 54 and turning the drive shaft 12 by an external power source.

The rotary engine 10 according to the present invention is extremely simple and inexpensive to manufacture. By making end covers 64 and end cover seal plates 68 identical, the tooling needed to make the engine 10 is reduced thereby reducing costs. Various materials can be used to construct the engine; in many cases, a plastic cast construction for the engine components apart from the combustion chamber would be sufficient, thereby reducing metallic components to a minimum.

In addition, engine 110 is extremely simple to assemble in manufacturing and to disassemble in case repairs are needed. All that need be done is to remove the tap bolts 70 holding the end cover seal plates 68 to the end covers 64 and the tap bolts 66 holding the end covers 64 to the stationary cylinder 50, and the interior of the engine 10 will be easily exposed for quick replacement of any worn parts. However, replacement of parts should not be a common occurrence since the only significant wear areas other than the main bearings 76 are the hump plates 96 and blade protrusions 38. These components could be constructed of materials of sufficient wear life. Since they are also of a simple mass production design, they are economical to produce or replace.

If engine 10 is operated on a continuous source of pressurized fluid as is preferred, it will produce a continuous torque on drive shaft 12. However, the ignition process does not have to be continuous, but could proceed at any predetermined cycle as desired. Engine 10 could be operated by the wind or by water power as long as such a source of power was reasonably constant. Due to the extremely simple nature of the present invention and the efficient manner of its operation, the horsepower to weight ratio of the engine 10 is very high.

Although the present invention has been illustrated in terms of a preferred embodiment it will be obvious to one of ordinary skill in the art that numerous modifications may be made without departing from the true spirit and scope of the invention which is to be limited only by the appended claims.

I claim:

1. A rotary engine driven by a pressurized fluid comprising:
    (a) a drive shaft;
    (b) a rotor secured to said drive shaft, said rotor having a plurality of radial slots each containing a movable blade; (c) a stationary cylinder concentrically positioned around said rotor and spaced therefrom, said stationary cylinder having a plurality of spaced chamber separators extending between said rotor and said stationary cylinder to form a plurality of pressure chambers, said blades extending into each said pressure chamber;
    (d) pressure and exhaust ports formed in said stationary cylinder communicating with each said pressure chamber;
    (e) a casing for connecting said pressure and exhaust ports with a supply of pressurized fluid and an exhaust outlet, respectively; and
    (f) a plurality of rotatable hump plates mounted in said casing adapted to engage a portion of each said blade to move said blades into and out of said pressure chambers as said hump plates rotate to clear the chamber separators and to be acted upon by the pressurized fluid to turn said drive shaft.

2. The rotary engine of claim 1 wherein one said hump plate is provided for each said pressure chamber, and the centers of said hump plates are positioned in said casing approximately along the radial lines between the center of said drive shaft and said chamber separators.

3. The rotary engine of claim 1 wherein each said blade has a protrusion projecting transversely from each side thereof, and said hump plates have a plurality of spaced peripheral recesses engaging said blade protrusions.

4. The rotary engine of claim 3 wherein the chordal pitch between adjacent of said recesses on said hump plates is equal to the chordal pitch between said protrusions on adjacent of said blades whereby said hump plates release one blade as they engage the next blade.

5. The rotary engine of claim 3 further including a blade protrusion receiver located in said casing beneath said blade protrusions, each said blade protrusion receiver having an arcuate recess positioned beneath each said hump plate to contact and guide said blade protrusions during transfer by said hump plates.

6. A rotary engine driven by a motive fluid comprising:
    (a) a drive shaft;
    (b) a rotor secured to said drive shaft, said rotor having a plurality of radial slots each containing a movable blade;
    (c) each of said blades having a protrusion projecting transversely from each side thereof;
    (d) a stationary cylinder concentrically positioned around said rotor and spaced therefrom, said stationary cylinder having a plurality of spaced chamber separators extending between said rotor and said stationary cylinder to form a plurality of pressure chambers, said blades extending into said pressure chambers;
    (e) pressure and exhaust ports formed in said stationary cylinder communicating with each said pressure chamber;
    (f) means for moving said blades beneath said chamber separators and back into said pressure chambers to be acted upon by the pressurized fluid to turn said drive shaft;
    (g) said means for moving said blades including a plurality of rotatable hump plates carried by each said end cover, said hump plates engaging said protrusions on said blades to move said blades in and out of said slots as said hump plates rotate;
    (h) two end covers closing said stationary cylinder and connecting said pressure and exhaust ports to a pressurized fluid supply and an exhaust outlet respectively; and
    (i) means for securing both said end covers to said stationary cylinder.

7. The rotary engine of claim 6 wherein both said end covers are the same diameter as said stationary cylinder and have a central bore through which said drive shaft passes.

8. The rotary engine of claim 6 wherein both said end covers are identical.

9. The rotary engine of claim 6 wherein both said end covers have anti-friction bearings surrounding said drive shaft and a seal placed between said end covers and said drive shaft outside of said bearings.

10. The rotary engine of claim 6 further including an end cover seal plate removably secured to the outer faces of each said end cover, each said end cover having an annular chamber communicating at one end with said pressure or exhaust ports, respectively, and at the other end with a pipe in each said end cover seal plate, said pipe being connected to said pressurized fluid supply or said exhaust outlet respectively.

11. The rotary engine of claim 10 further including seals placed between each said end cover seal plate and said end cover and between each said end cover and said stationary cylinder.

12. The rotary engine of claim 6 further comprising means for limiting the outward movement of each said blade.

13. The rotary engine of claim 12 wherein said limiting means comprises a stop ring placed in an annular groove in each side of said rotor positioned to abut a portion of said blade, said stop rings located to prevent contact of said blade with said stationary cylinder when said blade is in its outermost position.

* * * * *